Figure 1:
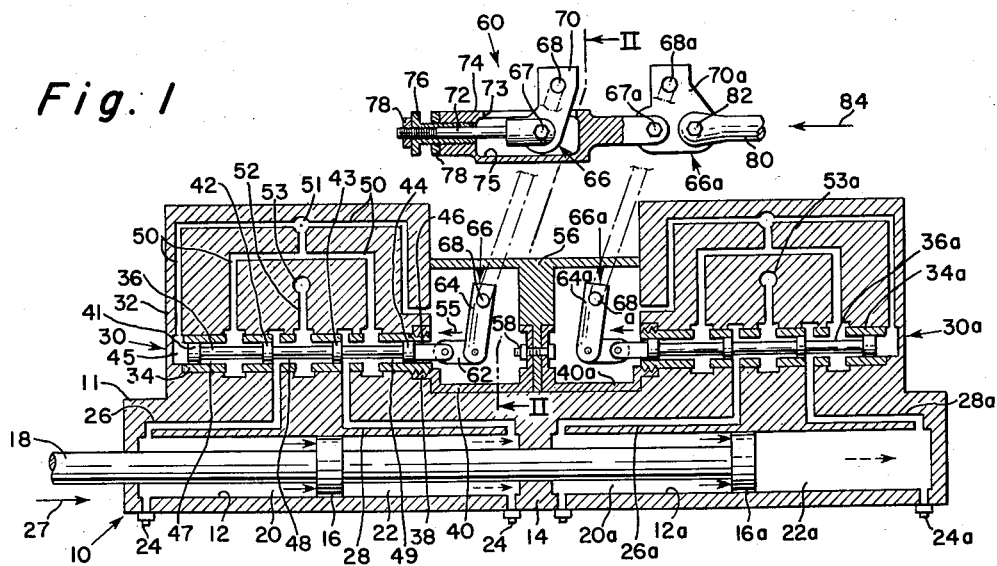

Jan. 3, 1961

R. S. BUZARD 2,966,892

TEMPERATURE COMPENSATING MECHANISM
FOR SERVO DEVICES
Filed Oct. 5, 1959

INVENTOR.
ROBERT S. BUZARD

BY
ATTORNEYS

United States Patent Office 2,966,892
Patented Jan. 3, 1961

2,966,892

TEMPERATURE COMPENSATING MECHANISM FOR SERVO DEVICES

Robert S. Buzard, Dallas, Tex., assignor, by mesne assignments, to the United States of America as represented by the Secretary of the Navy Filed Oct. 5, 1959, Ser. No. 844,599

7 Claims. (Cl. 121—46.5)

This invention relates to servo valves and, more particularly, to a temperature compensating mechanism for synchronizing the positional relation of jointly-operated servo valves within a range of thermal environment.

One type of electro-mechanical mechanism frequently used for actuating aircraft control surfaces comprises a tandem power control cylinder having a common piston articulated to the respective control surface. The direction of control surface movement is controlled by a pair of servo valves positioned by pilot input, which valves port pressurized fluid to either side of the respective pistons, depending on the direction of surface movement. In one such power control mechanism a dual system is present, each system including a separate fluid source, a servo valve and one piston of the tandem cylinder. This arrangement provides a safety feature in that failure of one system during flight still leaves the other system available to move the control surface.

One inherent characteristic of the foregoing described power control mechanism is that the servo valves controlling the oil flow to the pistons must maintain synchronization over a full range of temperature environment, the limits of which are rapidly widening in modern aircraft operating in higher altitudes. If synchronization is not maintained between the respective valve sliders and valve sleeves, it is likely that the two valves of the tandem cylinder will cause the pistons to oppose each other and result in sluggish operation of the control surface.

Due to space limitations in some aircraft designs, the servo valves for the tandem cylinder must be arranged end-to-end, which creates a difficult temperature compensating problem, particularly in that such valves are usually installed in an aluminum cylinder which has low weight, but a high coefficient of expansion.

The present invention overcomes these problems by providing a temperature compensating mechanism to maintain the synchronization of the servo valves over a wide temperature range to which the actuating mechanism may be subjected. The mechanism includes an internal synchronizing means, i.e. for maintaining the respective valve sleeves in fixed relative position, and, an external synchronizing means, in other words, for maintaining the valve sliders in fixed relative position, whereby the valve sliders are synchronized with their respective valve sleeves to nullify any effects due to temperature changes.

A principal object of this invention is to provide a mechanism for synchronizing the operation of a tandem power control system in variable thermal conditions.

Another important object is to incorporate a mechanism in the servo valve system for compensating for the effects of temperature change.

Still another object is to prevent sluggish operation of a tandem power control cylinder caused by temperature change.

Figure 2:
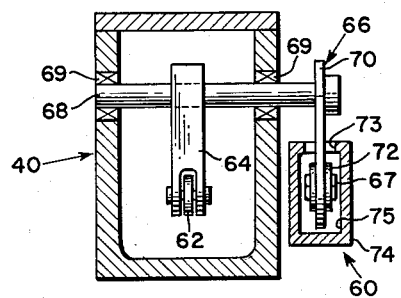

Other objects and many of the attendant advantages of this invention will be readily appreciated as the same becomes better understood by reference to the following detailed description when considered in connection with the accompanying drawings wherein:

Fig. 1 is a schematic elevation view in section of the tandem power cylinder actuated in one direction of control surface movement; the external synchronizing mechanism being transposed from behind the power cylinder to a position above the cylinder for sake of clarity, the common rotational axis of the jack shaft being indicated by the phantom lines; and Fig. 2 is a cross-section taken along line I—I of Fig. 1 showing the power control cylinder and the external synchronizing mechanism in their actual physical position in side-by-side relation.

Referring to the drawing where like reference numerals refer to similar parts throughout the drawing, numeral 10 in Fig. 1 designates a conventional tandem power-control cylinder commonly utilized to actuate various aircraft control surfaces. Cylinder 10 and the associated servo valves to be described are arranged in tandem in the drawing, one at the left-hand and the other at the right-hand, the right-hand counterpart being assigned the same reference numeral with the suffix "a." To avoid needless duplication, the description will be confined to the components on the left, and except where noted, will apply equally to the counterpart components at the right. Cylinder 10 comprises a cylinder block 11 usually constructed of cast aluminum or the like, having two cylinder bores 12 and 12a separated by a partition wall 14. Slidably mounted in the bores are tandem pistons 16 and 16a, respectively, integral on a common piston rod 18 articulated in any suitable manner to a control surface (not shown).

Each piston divides the respective bore into opposite chambers 20 and 22 having bleed valves 24 at their outer ends. It is apparent that admission of pressurized hydraulic fluid in line 26 to chamber 20 will move the piston to the right, as indicated by arrow 27, venting the fluid in chamber 22 to return in line 28. The same operation normally occurs on piston 16a in the other cylinder half in phase with the force created on piston 16 to actuate the control surface jointly. As will be described, an independent fluid source is provided for each cylinder half in lines 26 or 28 and lines 26a or 28a as a safety measure, and, in the event of failure of one source the other source is still available through the associated piston to move the control surface and maintain flight control of the aircraft.

The admission and venting of both halves of the tandem power cylinder is controlled by a pair of servo valves 30, 30a presently to be described. As previously noted, the tandem cylinder arrangement creates a problem in that the servo valves must be maintained in synchronism under variable temperature conditions to prevent the two cylinder halves from getting out of phase to an extent to oppose one another, which will create a drag on piston rod 18 and cause sluggish operation of the controls. Since servo valves may have a very sensitive pressure characteristic, the permissible desynchronization may be as small as .001 inch. Synchronization of the servo valves is accomplished in the present invention by the employment of so-called internal and external synchronizing mechanisms presently to be described.

Servo valves 30, 30a are arranged in mirror image in a valve block 32 which can be integral with cylinder block 11 and likewise constructed of cast aluminum, or the like. Each servo valve comprises a fixed valve sleeve 34, 34a and a valve slider 36, 36a reciprocally disposed therein. Threadably attached at 38 to the inner end of valve sleeve 34 is a cage 40 which houses the actuating linkage connected to valve slider 36.

Valve slider 36 has four lands 41, 42, 43 and 44 that form in the valve sleeve end chambers 45, 46 and three intermediate chambers 47, 48 and 49. Chambers 45, 47 and 49, 46 are vented by lines 50 to return port 51, end chamber 46 being vented via cage 40. The intermediate lands forming chamber 48 alternatively directs pressurized fluid in line 52 from supply port 53 to lines 26 or 28 leading to cylinder chambers 20 and 22, respectively, on either side of piston 16. When servo valve slider 36 is moved to the left, indicated by arrow 55 in Fig. 1, pressurized fluid is admitted to chamber 20 forcing piston rod 18 and the control surface linkage to the right as indicated by arrow 27. Valve slider 36a and piston 16a move in the same direction as slider 36 and piston 16, in a manner to be described, supplementing the actuating force on the control surface.

Cage 40 housing the valve slider actuating linkage functions as an internal synchronizing mechanism being constructed of a material having an insignificant linear expansion. A suitable material is a metallic alloy commercially known as "Super Invar," comprising a nickel steel alloy having a coefficient of linear expansion of approximately one-millionth-inch per degree centigrade at ordinary temperatures. Because of the cage material, the relative movement of valve sleeves 34 and 34a due to thermal expansion is sufficiently small not to be detrimental to operation of the tandem power control cylinder. Cages 40 and 40a are mounted back-to-back to a partition wall 56 of the valve block by a connecting bolt 58.

The internal synchronizing mechanisms just described and common external synchronizing mechanism 60 cooperate to maintain the servo valve sliders 36, 36a synchronized with their respective valve sleeves 34, 34a in the following manner. Slider 36 is connected to the synchronism mechanism by a drag link 62 pivotally attached thereto and to one arm 64 of a U-shaped jackshaft 66. The function of external synchronizing mechanism 60 is to maintain jackshafts 66 and 66a separated a constant distance throughout the thermal range. The shaft portion 68 of the jackshaft is journalled at 69 to the valve block on a rotational axis transverse thereto. The other arm 70 of the jackshaft 66 is pivotally pinned at 67 to a right-hand end of a rod member 72 of external synchronizing mechanism 60. A counterpart arm 70a of jackshaft 66a is pivoted at 67a to the right end of a link member 74 of mechanism 60. As is apparent from Fig. 1, link 74 is concentric with and substantially longer than rod 72, to an extent later to be described. Link 74 has an elongated recess 75 freely housing rod 72 for expansion and contraction, link 74 being slotted at 73 to permit jackshaft arm 70 to extend freely therethrough into the recess. Both left ends of the rod and link members are connected together by an intermediately positioned, internally and externally threaded, hollow screw 76 adjustably locked to the respective members by lock nuts 78.

The length of members 72 and 74 are dependent on the coefficient of linear expansion of the materials from which the respective members are made bearing in mind that the purpose of the synchronizing mechanism 60 is to maintain the respective jackshaft arms 70, 70a at a fixed or constant distance throughout the temperature range to which the equipment is subjected. By fabricating longer link member 74 of steel having a coefficient of expansion approximately $.633 \times 10^{-5}$ and fabricating the shorter rod member 72 of aluminum having a coefficient of expansion approximately $1.24 \times 10^{-5}$, in order to cancel out the effects of thermal expansion, the lengths of the respective members would be according to the inverse ratio $1.24/.633$. In other words, steel link 72 should be about twice as long as aluminum rod 74, as they appear approximately in Fig. 1.

Jackshafts 66 and 66a are jointly actuated by a conventional pilot input linkage 80 connected to synchronizing mechanism 60 by pivot pin 82 extending through arm 70 adjacent the pivot pin 67.

Operation of the tandem power cylinder is apparent from the drawing. Fig. 1 illustrates cylinder operation under a pilot input linkage movement 80 to the left (arrow 84). Jackshafts 66 and 66a are pivoted clockwise about their rotational axis by rod 72 and link 74, respectively, moving their servo valve sliders 36 and 36a also to the left. Assuming valve sliders 36, 36a are synchronized with their respective valve sleeves, pressurized fluid from ports 53, 53a will be directed to the respective tandem cylinder chambers 20, 20a, and the opposite chambers 22, 22a will be vented simultaneously and in synchronism. Pistons 16, 16a are moved to the right in unison to impart the desired movement to the control surface.

In the event the mechanism is subjected to a higher thermal environment, both valve sliders 36, 36a still will be jointly actuated the same amount because the distance between jackshaft arms 70 and 70a will remain the same through operation of the external synchronizing mechanism 60. This is accomplished by the cancellation of the respective expansions in the link and rod members. Supplementing this synchronizing action, internal synchronizing cages 40, 40a negate any appreciable expansion between the slider sleeves 34, 34a. Thus, the joint action of the internal and external synchronizing mechanisms maintains the servo valve sleeves and valve sliders respectively, synchronized throughout various temperature conditions to synchronize the movement of the pistons in the tandem power control cylinder.

Obviously many modifications and variations of the present invention are possible in the light of the above teachings. It is therefore to be understood that within the scope of the appended claims the invention may be practiced otherwise than as specifically described.

I claim:

1. A tandem power control cylinder having two pistons integrally mounted on a common rod, a pair of servo valves having sliders controlling a hydraulic fluid flow to and from the respective pistons, a control linkage articulated to said valve sliders, said linkage including temperature compensating means for maintaining said valve sliders at a substantially fixed distance apart throughout a variable temperature environment to which the cylinder may be subjected, whereby the servo valves remain synchronized in said environment.

2. A tandem power control cylinder having two pistons integrally mounted on a common rod, a pair of servo valves having sliders controlling a hydraulic fluid flow to and from the respective pistons, a control linkage articulated to each of said valve sliders including an actuating arm, temperature compensating means connecting said linkages together to maintain said valve sliders at a substantially fixed distance apart throughout a temperature range to which the cylinder may be subjected, said compensating means comprising two elongate metallic members of different lengths connected together at corresponding ends, the members connected at their other ends to the respective arms, said members being made of different material having coefficients of expansion inversely proportional to their lengths, whereby the servo valves remain synchronized in said environment.

3. A tandem power control cylinder having two pistons integrally mounted on a common rod, a pair of in-line servo valves each having a valve sleeve and a valve slider movable therein to control a hydraulic fluid flow to and from the respective pistons, an internal temperature compensating means interconnecting adjacent ends of the valve sleeves, said means formed of a material having an insignificant coefficient of expansion to prevent relative movement between said valve sleeves, control linkage articulated to each of said valve sliders, an external temperature compensating means connecting said linkage together to maintain said valve sliders at a substantially fixed distance apart throughout a variable temperature environment to which the cylinder may be subjected, whereby the respective valve sleeves and the valve sliders remain synchronized in said environment.

4. The device of claim 3 wherein said internal temperature compensating means comprises a cage attached to each valve sleeve and housing an end of the respective slider, said cages being secured together to the cylinder end-to-end.

5. The device of claim 3 wherein said external temperature compensating means comprises a long link member and a short concentric rod member threadedly connected at corresponding ends, said members being made of metal having a coefficient of expansion inversely proportional to their respective lengths to cancel out any relative change in linear expansion due to temperature changes, said link member having a hollow recess to freely house said rod member for expansion and contraction, ends of the members opposite the threaded connection being pivotally connected to said control linkage.

6. A tandem power-control cylinder having two pistons integrally mounted on a common rod, a pair of in-line servo valves arranged in mirror image, each valve having a valve sleeve and a valve slider movable therein to control the hydraulic fluid flow to and from the respective pistons, an integral temperature compensating means comprising a cage threadedly attached to each valve sleeve and housing an end of the respective valve slider, said cages being secured together in end-to-end relation, said cages constructed of a material having an insignificant coefficient of expansion to prevent relative movement between said valve sleeves, an external temperature compensating mechanism comprising a long metallic link member and a short concentric metallic rod cylinder threadedly connected together at respective ends with the other ends of the members being free, a jackshaft for each servo valve journalled to said cylinder each of said jackshafts having two arms, one arm being pivoted to the respective valve slider and the other arm pivoted to the free end of respective member of the external temperature compensating mechanism, said members being made of material having a coefficient of expansion inversely proportional to their length to cancel out any relative change in linear expansion, said link member having a hollow recess to freely house said rod member for expansion and contraction, whereby the respective valve sleeves and the valve sliders remain synchronized throughout a variable temperature environment.

7. A temperature compensating mechanism for actuating two devices in synchronism comprising a long link member and a short concentric rod member threadedly connected at corresponding ends, said members being made of metal having a coefficient of expansion inversely proportional to their respective lengths to cancel out any relative change in linear expansion due to temperature changes, said link member having a hollow recess to freely house said rod member for expansion and contraction, means at the ends of the members opposite the threaded connection for attaching to the devices.

References Cited in the file of this patent

UNITED STATES PATENTS

| | | |
|---|---|---|
| 2,423,516 | Naab et al. | July 8, 1947 |
| 2,898,889 | Foster | Aug. 11, 1959 |